(12) United States Patent
Aichele (10) Patent No.: US 7,146,893 B2
(45) Date of Patent: Dec. 12, 2006

(54) CUTTING DEVICE AND CUTTING TOOL

(75) Inventor: Wilhelm Aichele, Crailsheim (DE)

(73) Assignee: Aichele Werkzeuge GmbH, Crailsheim (DE)

( * ) Notice: Subject to any disclaimer, the term of this patent is extended or adjusted under 35 U.S.C. 154(b) by 2 days.

(21) Appl. No.: 10/077,578

(22) Filed: Feb. 14, 2002

(65) Prior Publication Data

US 2002/0144580 A1 Oct. 10, 2002

(30) Foreign Application Priority Data

Feb. 21, 2001 (DE) .................... 101 09 933

(51) Int. Cl.
*B23D 25/12* (2006.01)

(52) U.S. Cl. .................. 83/346; 83/659; 83/698.1; 464/180

(58) Field of Classification Search ............ 83/502, 83/659, 332, 346, 505, 506, 508.2, 698.61, 83/343, 344, 345, 347, 348; 492/6, 20, 47; 74/573 R; 464/180
See application file for complete search history.

(56) References Cited

U.S. PATENT DOCUMENTS

| | | | |
|---|---|---|---|
| 2,224,668 A | 12/1940 | Christian | |
| 4,063,479 A * | 12/1977 | Roncato | 83/117 |
| 4,455,903 A * | 6/1984 | Kesten | 83/346 |
| 4,485,710 A | 12/1984 | Schlisio et al. | |
| 4,607,831 A | 8/1986 | Raybuck | |
| 4,622,730 A * | 11/1986 | Steinbock | 492/1 |
| 4,756,219 A | 7/1988 | Pohl et al. | |
| 4,759,247 A * | 7/1988 | Bell et al. | 83/346 |
| 4,770,078 A * | 9/1988 | Gautier | 83/344 |
| 4,885,964 A * | 12/1989 | Nielsen et al. | 83/56 |
| 4,936,818 A * | 6/1990 | Holohan, Jr. | 493/396 |
| 5,074,180 A * | 12/1991 | Mayer et al. | 83/698.42 |
| 5,452,634 A * | 9/1995 | Wilson | 83/99 |
| 5,857,396 A * | 1/1999 | Strouse, Jr. | 83/502 |
| 6,244,148 B1 | 6/2001 | Vees | |
| 2002/0020270 A1 | 2/2002 | Aichele | |
| 2002/0029675 A1 | 3/2002 | Aichele | |

FOREIGN PATENT DOCUMENTS

| | | |
|---|---|---|
| DE | 31 24 053 | 12/1982 |
| DE | 198 34 104 | 2/2000 |
| EP | 0 947 717 | 10/1999 |

* cited by examiner

*Primary Examiner*—Boyer D. Ashley
*Assistant Examiner*—Isaac Hamilton
(74) *Attorney, Agent, or Firm*—Lipsitz & McAllister, LLC (57) ABSTRACT

In order to provide a cutting device, comprising a machine frame, an anvil roller which is mounted for rotation on the machine frame and a cutting tool which is mounted for rotation on the machine frame, wherein the cutting tool has a cutting edge cooperating with anvil surfaces of the anvil roller, with which the springing away on account of lateral cutting forces is minimized it is provided for the cutting tool to be biased essentially parallel to its axis of rotation.

31 Claims, 6 Drawing Sheets

CUTTING DEVICE AND CUTTING TOOL

The invention relates to a cutting device, comprising a machine frame, an anvil roller which is mounted for rotation on the machine frame and a cutting tool which is mounted for rotation on the machine frame, wherein the cutting tool has a cutting edge cooperating with anvil surfaces of the anvil roller.

Furthermore, the invention relates to a cutting tool which is rotatable about an axis of rotation and has a cutting edge which can be brought into cooperation with anvil surfaces of an anvil roller.

Cutting devices of this type are known, for example, from DE 31 24 053 A1 or DE 198 34 104 A1. The German patent applications 100 44 705.8 and 100 40 024.8 which are not prior publications likewise describe such cutting devices and cutting tools.

Continuous webs of material consisting, for example, of paper, non-woven fabrics, textiles, plastic foils or metal foils may be cut by means of such rotary cutting devices.

The object underlying the invention is to provide a cutting device and a cutting tool, with which any springing away of the cutting tool caused by lateral cutting forces is minimized.

This object is accomplished in accordance with the invention, with the cutting device specified at the outset, in that the cutting tool is prestressed essentially parallel to its axis of rotation.

It has been shown in practice that cutting tools, in particular, in the case of a large span and/or small diameter are subject to transverse oscillations, which are caused by lateral cutting forces, transverse to the axis of rotation during a cutting procedure. These oscillations may be reduced with respect to their amplitude and/or excited to a reduced degree when the cutting tool is biased. This effect corresponds to that of an oscillating string which is tensioned: In this case, the amplitude is reduced (and the frequency increased) when a tensile stress is exerted on the string with an unchanged force excitation in comparison with the non-tensioned state. Accordingly, a greater force action is necessary to achieve the same amplitude in the tensioned state.

In accordance with the invention, the mode structure of the cutting tool is altered by the biasing in such a manner that oscillations are reduced which are caused by lateral cutting forces. As a result, the quality of the cut when cutting a workpiece web is increased and the service life of the cutting tool is increased since the load on the cutting edge is reduced.

In accordance with the invention, a maximum oscillation amplitude of less than 2 µm in the center of a cutting tool may be achieved due to the biasing of the cutting tool having a span of 700 mm and a diameter of 300 mm.

The increase in the intrinsic frequencies of the cutting tool by means of the biasing also has a favorable effect on the oscillation excitability of the cutting tool. Low machine frequencies, in particular, contribute to an oscillation excitation of the cutting tool. If its intrinsic frequencies are increased, the oscillation excitability of the cutting tool is reduced.

In order to achieve a mode structure of the cutting tool, by means of which any springing away due to lateral cutting forces is reduced, it is particularly favorable when the cutting tool is subject to a tensile load. Such a tensile load may also be brought about in a constructionally favorable manner.

It is particularly advantageous when the cutting tool is braced with such a force that a maximum oscillation amplitude of the cutting tool is below a predetermined value. In principle, the biasing acting on the cutting tool can be adjusted; if the adjustment takes place in such a manner that the amplitude is below a predetermined value, it is ensured that the cutting forces are adjusted in an optimum way and, in particular, any yielding in the case of lateral cutting forces is minimized.

In a particularly favorable embodiment from a constructional point of view, the cutting tool has an outer sleeve, on which the cutting edge is seated, and has an inner section, wherein outer sleeve and inner section are braced against one another with a tensional force acting essentially parallel to the axis of rotation of the cutting tool. As a result, the cutting tool may be biased in a simple manner without the machine frame and, in particular, bearing, in which the cutting tool is mounted, needing to be modified. As a result of the bracing of the inner section (core shaft) against the outer sleeve, the rigidity of the cutting tool is increased in order to therefore modify the mode structure of the cutting tool with respect to a reduced oscillation excitability/amplitude reduction.

It is favorable when inner section and outer sleeve are braced such that the inner section is subject to a tensile load in the direction of the outer sleeve. This may be achieved in a simple manner, in particular, by means of form-locking elements, such as tension screws. As a result, it is also possible, in particular, to overcompensate for pressure forces which are exerted on the inner section (the core shaft) via the outer sleeve in order to keep the oscillation amplitudes small even with a force load due to cutting forces.

Outer sleeve and inner section may be braced in a constructionally simple manner by means of form-locking connections. The form-locking connections may be attached in a simple manner. Selective biasing forces may be adjusted due to a corresponding dimensioning of the associated form-locking elements (diameter, length) and due to their arrangement. For example, amplitudes of less than 2 µm may be achieved in the center of the cutting tool by way of eight screws between outer sleeve and inner section between the respective end faces and a biasing force corresponding to 100 t in the case of a cutting tool with a span of 700 mm and a diameter of 300 mm.

A connection direction of a form-locking connection is oriented, in this respect, parallel to the axis of rotation of the cutting tool and, in particular, is oriented parallel to the axis of rotation with high precision. As a result, a tensile stress between outer sleeve and inner side of the cutting tool may be selectively adjusted.

It is, in addition, advantageous for the uniform biasing of the cutting tool when a plurality of form-locking connections are arranged around the axis of rotation uniformly in relation to it. The arrangement of the form-locking connections is then point-symmetric in relation to the axis of rotation.

A pressure force may be exerted on an end face of an outer sleeve in the direction of the inner section when a form-locking element has a corresponding contact surface for forming a form-locking connection. A screw element, by means of which a tensile force can be exerted on the inner section, is then seated on the contact element. In this way, it is also possible for pressure forces on the inner section to be overcompensated, i.e. the cutting tool remains biased as a whole even with active cutting forces in order to reduce the oscillation amplitudes.

The dimensions of a form-locking element and/or the number of form-locking connections are favorably adapted to the diameter and the span of the cutting tool. With a large span and small diameter it may, for example, be necessary to provide a larger number of form-locking connections which then have a smaller diameter. On the other hand, in the case of a short span and larger diameter it may be sufficient to provide a smaller number of form-locking connections with a correspondingly large diameter. In a variation of one embodiment, the cutting tool is provided with supporting rings, by means of which this can be supported in relation to the anvil roller and/or vice versa. A supporting ring which is also designated as a bearer ring has a supporting effect for the cutting tool in relation to an anvil roller. The cutting tool may be advanced towards the anvil roller by means of supporting rings to such an extent that an adequate cutting effect is still given even with maximum cutting forces.

In this respect, the diameter of a supporting ring surface can advantageously be adjusted for each supporting ring due to radial expansion of the supporting ring in the range below an elastic expansion limit of its material by means of an expansion device. As a result, the possibility is created of designing the diameter of the supporting ring surfaces so as to be variable in order to take into account any alteration in the radial extension, in particular, of the cutting edge. For example, in the case of a new cutting edge, i.e. one not worn down, the supporting ring is first of all expanded to a maximum but still in a range below its elastic expansion limit so that the supporting ring surface has the maximum diameter. If the cutting edge is worn down, the expansion may be reduced by the adjustable expansion device, wherein, as a result of the fact that the expansion is in the range below the elastic expansion limit of the supporting ring, the supporting ring shrinks of its own accord in the sense of a smaller expansion on account of its elastic behavior when the expansion device is reset and, therefore, the diameter of the supporting ring surface can be reduced in accordance with the wear on the cutting edge.

In this respect, expandable supporting rings may be present not only on the cutting tool but also on the anvil roller or both on the cutting tool and on the anvil roller. In the last-mentioned case, when supporting rings are provided both on the cutting tool and on the anvil roller and corresponding supporting ring surfaces abut on one another, a double adjustment range can be achieved.

The expansion device may have cooperating wedge surfaces which are adjustable in their position relative to one another in order to expand the supporting ring in an adjustable manner.

Expandable supporting rings and their functioning are described in the German application No. 100 40 024.8 which is not a prior publication and to which reference is expressly made.

In this respect, it may be provided for the diameter of a supporting ring to be adjustable by means of a form-locking element, with which a tensile stress can be exerted on an inner section of the cutting tool in relation to an outer sleeve, i.e. for a form-locking element for the biasing of the cutting tool to be part of the expansion device. As a result, the cutting tool may be biased and the supporting rings may be expanded at the same time.

Alternatively, it may be provided for the cutting tool to be biased independently of the expansion of the supporting rings, i.e. for the form-locking elements not to be part of the expansion device. As a result, the biasing of the cutting tool may be decoupled from the expandability of the supporting rings and so the influence of biasing parallel to the axis of rotation and expansion of the supporting rings transversely and, in particular, at right angles to the axis of rotation do not essentially influence one another. For example, the cutting tool is biased first of all and then a supporting ring is expanded.

In an alternative embodiment of a cutting device, a biasing device for the cutting tool is arranged on the machine frame, a tensile stress being exertable on oppositely located bearing ends of the cutting tool by means of this device. The biasing device therefore causes the biasing of the cutting tool in order to alter its mode structure with respect to the minimizing of any springing away in the case of lateral cutting forces. The biasing device can, for example, act on bearings, in which the cutting tool is mounted for rotation, namely with a direction of force parallel to the axis of rotation. The biasing device may, alternatively, also act directly on the cutting tool, i.e. on the cutting tool shaft, in order to exert a tensile stress on this. This may, for example, be brought about due to corresponding tensioning of the cutting shaft or also due to the fact that the cutting shaft is loaded with weights.

The object specified at the outset is accomplished, in addition, by a generic cutting tool which is biased essentially parallel to its axis of rotation.

This cutting tool has the advantages already explained in conjunction with the inventive cutting device.

Additional, advantageous developments have already been explained in conjunction with the inventive cutting device.

In accordance with the invention, it may also be provided, in the case of an embossing device, comprising a machine frame, an anvil roller which is mounted for rotation on the machine frame and an embossing tool which is mounted for rotation on the machine frame, wherein the embossing tool has an embossing structure cooperating with anvil surfaces of the anvil roller, to provide a biased embossing tool with a direction of biasing essentially parallel to the axis of rotation of the embossing tool.

As a result, the advantages already discussed in conjunction with cutting procedures result during an embossing procedure and, in particular, any springing away of the embossing tool in the case of lateral embossing forces may be reduced as a result.

Additional, advantageous developments of the inventive embossing device have already been explained in conjunction with the inventive cutting device, wherein only an embossing tool with an embossing structure is to be inserted each time instead of the cutting tool with the cutting edge.

Furthermore, an embossing tool can also be made available in accordance with the invention which is rotatable about an axis of rotation and has an embossing structure and which is biased essentially parallel to its axis of rotation.

In this case, again, the advantages already discussed in conjunction with the inventive cutting tool result, and additional, advantageous developments of the inventive embossing tool are designed analogously to the developments of the inventive cutting tool.

The inventive embossing tool may also be used, in particular, in conjunction with the ultrasonic cutting and/or ultrasonic welding of workpiece webs, with which a rotating embossing tool interacts, in particular, with a sonotrode as ultrasonic tool.

Additional features and advantages of the invention are the subject matter of the following description as well the drawings illustrating one embodiment.

Figure 1:
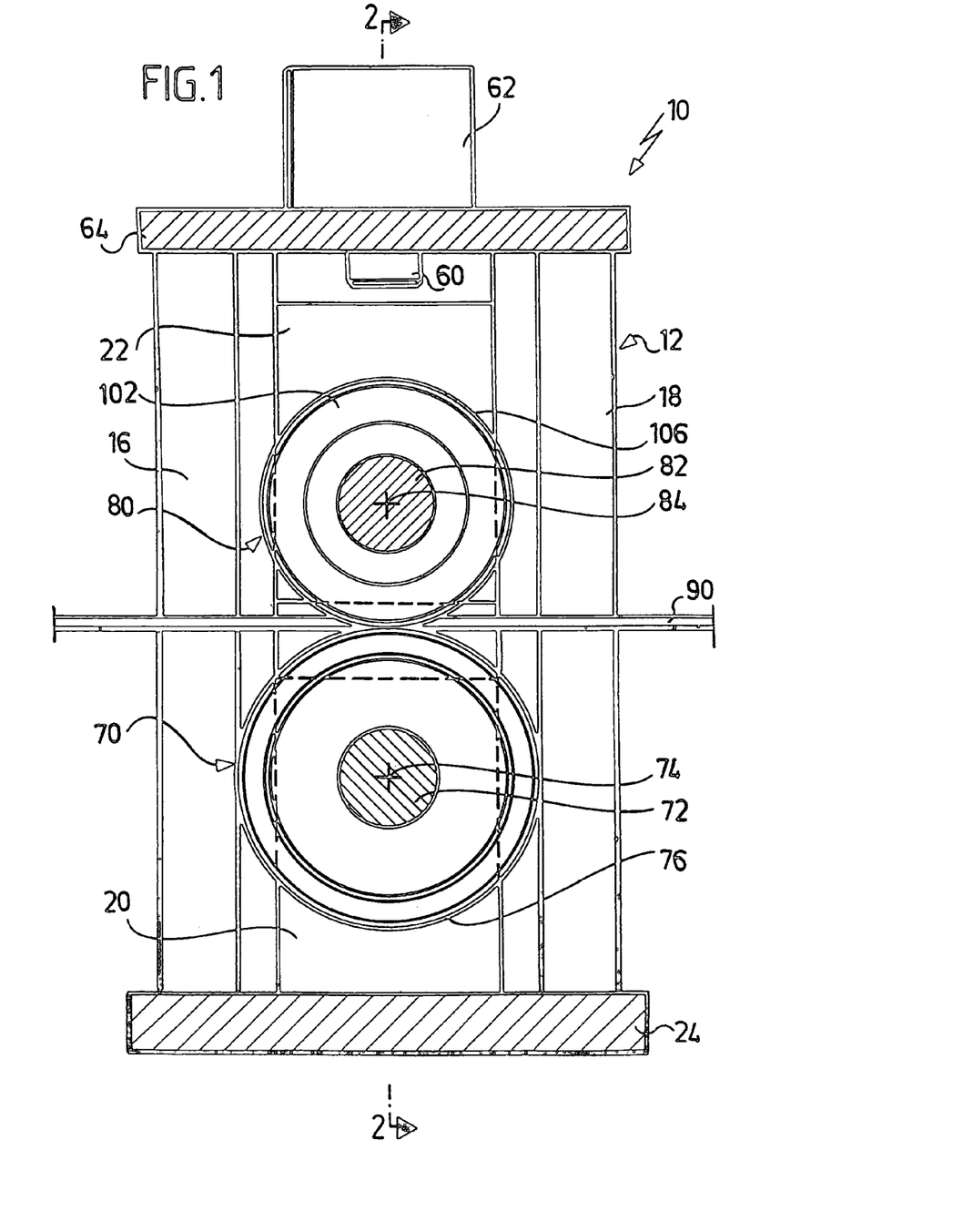
FIG. 1 shows a vertical section through one embodiment of an inventive cutting device along line 1—1 in FIG. 2.
Figure 2:
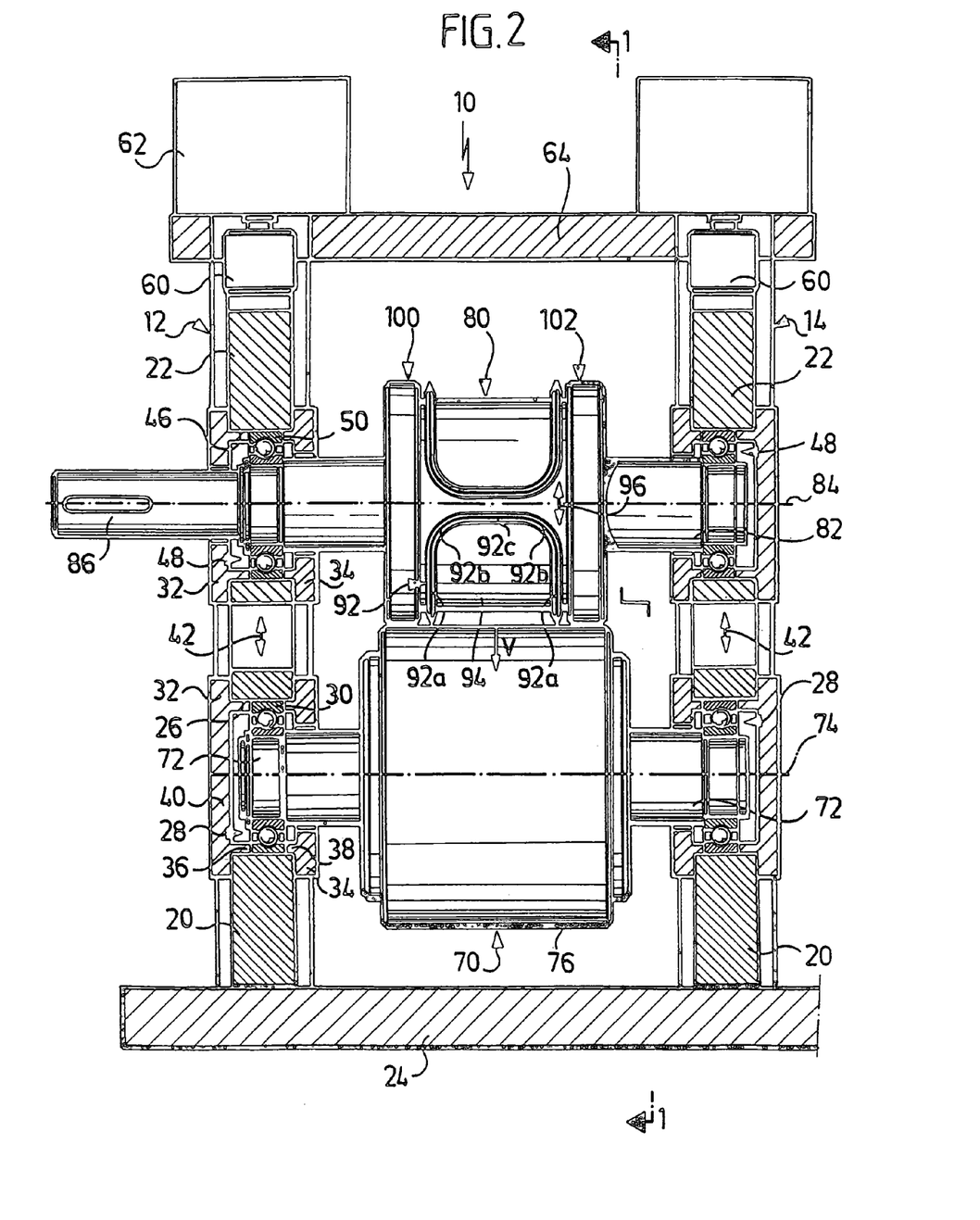
FIG. 2 shows a vertical section along line 2—2 in FIG. 1.

An inventive cutting device illustrated in FIGS. 1 and 2 in respective sectional views comprises a machine frame designated as a whole as 10 which has two bearing parts 12 and 14 arranged at a distance from one another.

Each of the bearing parts, for example, the bearing part 12 in FIG. 1 comprises two side supports 16 and 18, between which a lower bearing support 20 and an upper bearing support 22 are arranged.

The lower bearing support 20 is guided, on the one hand, between the side supports 16 and 18 and, on the other hand, is seated securely on a base plate 24 of the machine frame 10. The bearing support 20 has a bearing receiving means 26, into which a lower rotary bearing designated as a whole as 28 is inserted with its outer bearing ring 30, wherein the outer bearing ring 30 abuts on an inner surface of the bearing receiving means 26 with its outer circumferential side. The bearing ring 30 is fixed in the bearing receiving means 26 by an outer holding member 32 and an inner holding member 34 which abut with holding rings 36 and 38 on lateral annular surfaces of the outer bearing ring 30 and, therefore, fix this in the bearing receiving means 26. Moreover, the outer holding member 32 comprises at the same time a cover 40.

The upper bearing support 22 is guided between the side supports 16 and 18 and is arranged so as to be adjustable in the direction of the lower bearing support 20 in a direction 42 which extends parallel to the extension of the side supports 16 and 18. The upper bearing support 22 also has a bearing receiving means 46, into which an upper rotary bearing 48 is inserted.

The upper rotary bearing 48 is held with its outer bearing ring 50 in an abutting manner in the bearing receiving means 46 in the same way as the lower rotary bearing 28 with the outer bearing ring 30 and, in addition, an outer holding member 32 and an inner holding member 34 are provided which are designed in the same way as the holding members provided in the lower bearing support 20 and fix the outer bearing ring 50 of the upper rotary bearing 48 in the same way.

The upper bearing support 22 is supported for its part via a biasing device designated as a whole as 60 on an abutment 62 which is held on an upper plate 64 extending parallel to the base plate 24, wherein the upper plate 64 likewise connects the bearing parts 12 and 14 to one another and also fixes the side supports 16 and 18 relative to one another.

The bearing part 14 is also designed in the same way as the bearing part 12.

A stub shaft 72 is mounted in each of the two lower rotary bearings 28 and these shafts each project laterally from an anvil roller designated as a whole as 70 and are arranged concentrically to an axis of rotation 74 of the anvil roller 70 which has a greater radius than the stub shafts 72 and is provided with a circular-cylindrical anvil surface 76 arranged coaxially to the axis of rotation 74.

The anvil roller 70 is therefore mounted securely by the two lower rotary bearings 28 in the lower bearing supports 20 which, for their part, again rest on the base plate 24 and are guided between the side supports 16 and 18.

A rotatingly driven cutting tool 80 is mounted in the upper rotary bearings 48 of the upper bearing supports 22 so as to be rotatable with a tool shaft 82 about an axis of rotation 84, wherein the tool shaft 82 extends, for example, through the bearing part 12 and on its side located opposite the rotating cutting tool 80 has a drive stump 86 which projects beyond the bearing part 12 and via which a rotary drive of the rotating cutting tool 80 is bought about by means of a drive, for example, a motor.

The rotating cutting tool 80 can be moved due to the arrangement of the upper rotary bearings 48 in the upper bearing supports 22 and their displaceability in the direction 42 in the direction of the anvil roller 70. The rotating cutting tool 80 can be biased in the direction of the anvil roller 70 by means of the biasing devices 60 which act on the upper bearing supports 22 such that the tool acts as a whole with a biasing force V on the anvil roller 70.

The rotating cutting tool 80 has cutting edges 92 for separating a web of material 90 designated as a whole as 90 and guided between the rotating cutting tool 80 and the anvil roller 70, these cutting edges projecting from a base surface of the cutting edges, which is cylindrical, for example, in relation to the axis of rotation 84, in a radial direction in relation to the axis of rotation 84 with a constant radial extension with respect to the axis of rotation. For example, the cutting edge 92 comprises two cutting edge arms 92a which extend in an azimuthal direction in relation to the axis of rotation 84 and merge into cutting edge curves 92b which extend transversely thereto and are then connected by a transverse cutting edge 92c which extends approximately at right angles to the azimuthal direction 96 and, therefore, approximately parallel to the axis of rotation 84 (FIG. 3).

Figure 3:
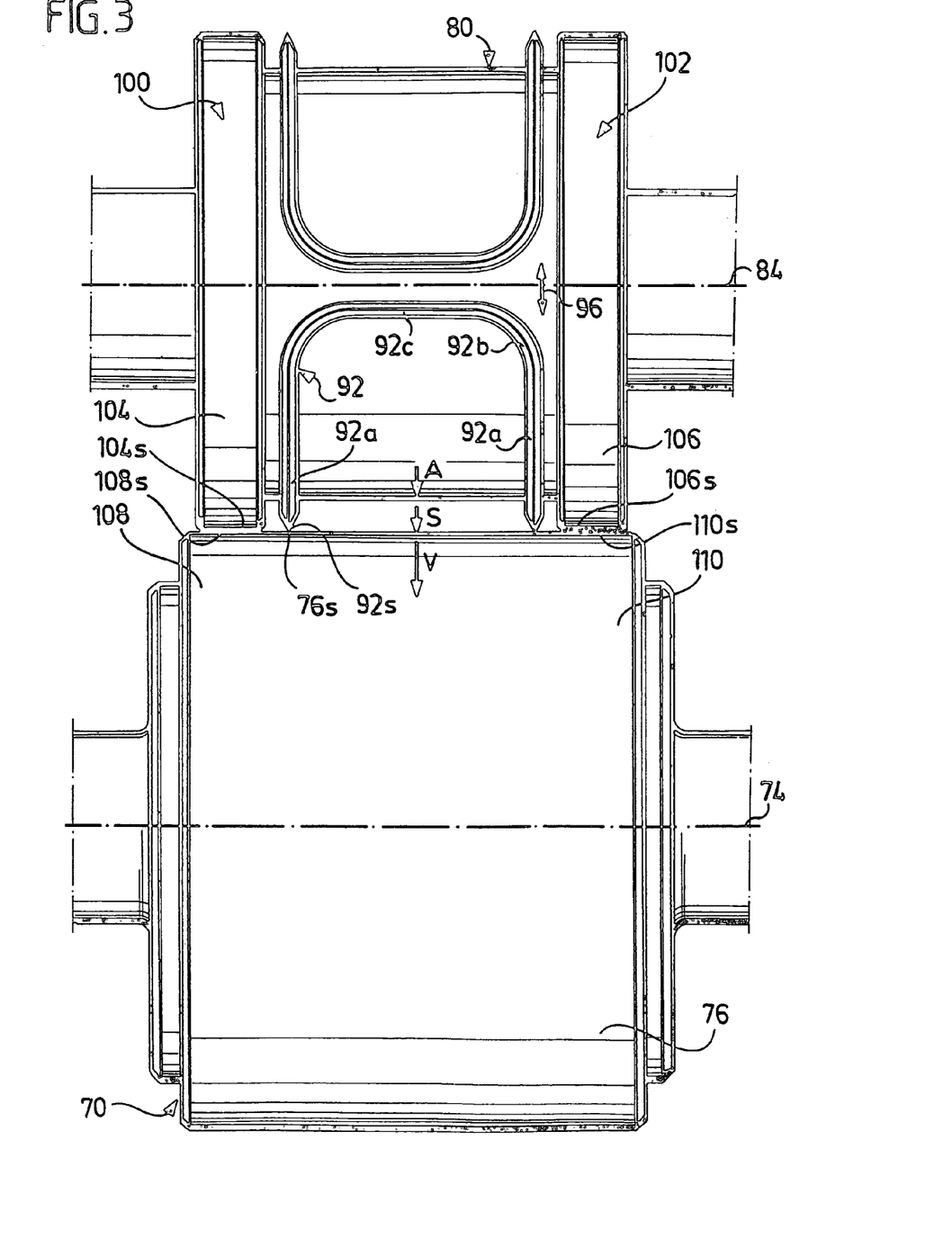
FIG. 3 shows an enlarged illustration of anvil roller and cutting tool in accordance with FIG. 2.

For example, the cutting edge 92 has two transverse cutting edges 92c, proceeding from which the respective cutting edge curves 92b extend in opposite directions and then merge into the cutting edge arms 92a which the cutting edge curves 92b located on each side of the transverse cutting edges 92c connect to one another, as illustrated on an enlarged scale in FIG. 3.

The cutting effect of the cutting edge 92 is brought about, as illustrated in FIG. 3, by an interaction of an effective cutting section 92s which is located opposite a corresponding anvil surface section 76s at the most minimum of distances or almost touches it, wherein due to the rotation of the rotating cutting tool 80 and co-rotation of the anvil roller 70 successive cutting sections 92s and anvil surface sections 76s are respectively in their effective position and cooperate in a cutting manner.

In order to determine a small distance between the respectively cooperating cutting sections 92s and anvil surface sections 76s or a so-called slight touching thereof in a defined manner, the rotating cutting tool 80 is provided with two non-rotatably connected supporting rings (bearer rings) 100 and 102 which are arranged, for example, on either side of the cutting edge 92 coaxially to the axis of rotation 84 and thereby have supporting ring surfaces 104 and 106, respectively, which are arranged, for example, cylindrically to the axis of rotation 84 and rest on supporting surfaces 108 and 110 of the anvil roller 70, wherein the supporting surfaces 108 and 110 can, for example, be formed by sections of the anvil surface 76.

The support is thereby brought about via the respective supporting ring sections 104s and 106s which are seated on corresponding supporting surface sections 108s and 110s of the supporting surfaces 108 and 110, wherein during the rotation of the rotating tool 80 in the opposite direction to the direction of rotation thereof supporting ring sections 104s and 106s arranged so as to follow one another cooperate with supporting surface sections 108s and 110s which are arranged so as to follow one another in the opposite direction to the direction of rotation of the anvil roller 70.

The supporting ring sections 104s, 106s and supporting surface sections 108s and 110s cooperating respectively with one another thereby absorb altogether a pressure load A, with which the rotating cutting tool 80 is supported on the anvil roller 70 and which represents a part of the biasing force V comprised thereby.

However, the biasing force V leads not only to the formation of the pressure load A, which acts via the supporting rings 100 and 102 on the anvil roller 70, but also to a cutting force S which is connected to a cutting length effective in the respective cutting section 92s.

Figure 4:
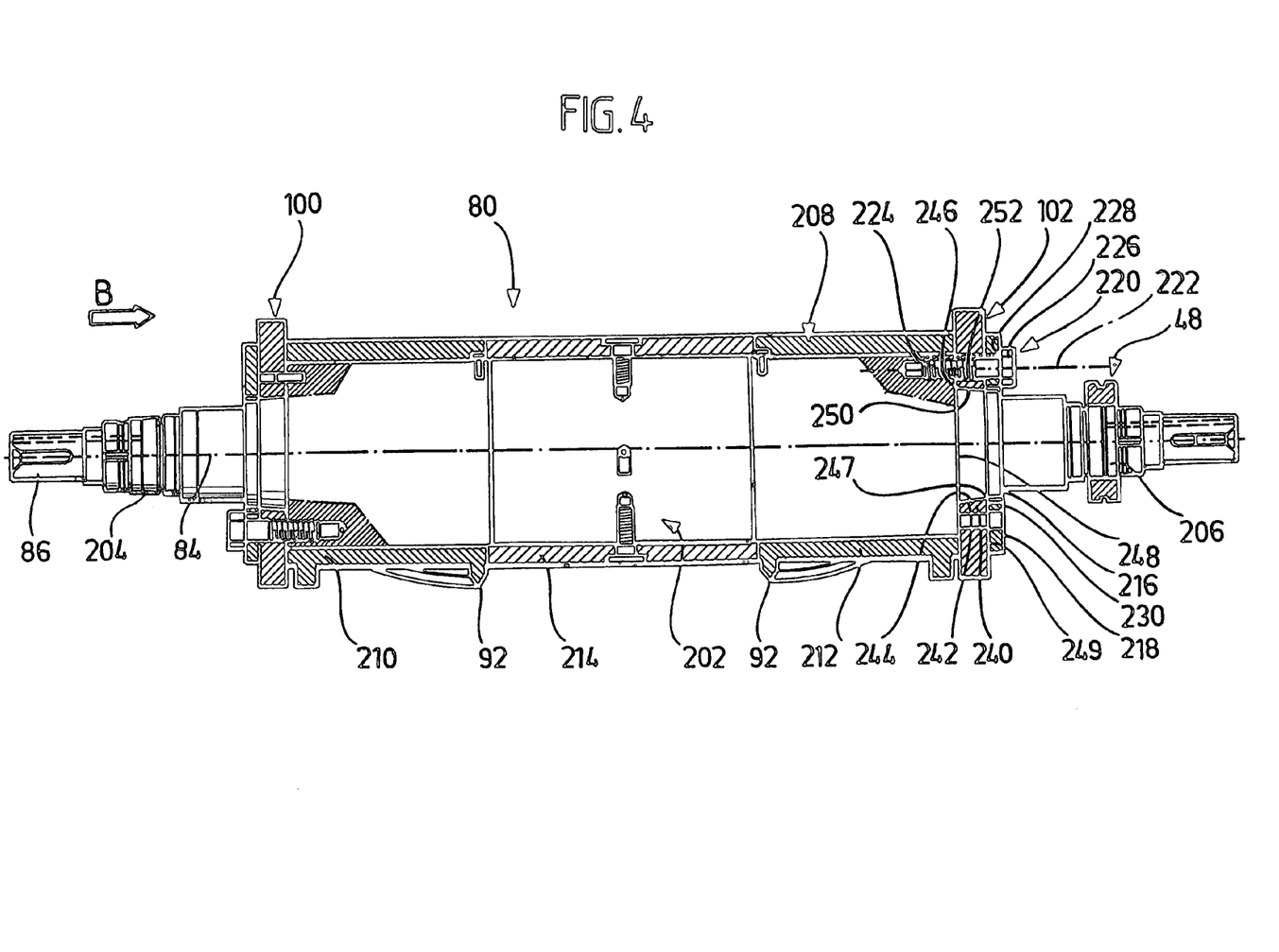
FIG. 4 shows a schematic longitudinal sectional view through an inventive cutting tool.

An inventive cutting tool comprises, as shown in FIG. 4, an inner section 202 which is designed as a core shaft and comprises the axis of rotation 84 and which is mounted via oppositely located bearing ends 204, 206 for rotation in rotary bearings 48.

An outer sleeve 208 is seated on the inner section 202 and surrounds the inner section so that this forms a core of the cutting tool 80. The outer sleeve 208 is, for example, of a three-part design with two respective cup-shaped outer sections 210 and 212 which can be pushed onto the inner section 202 at the ends and a center section 214 which has the shape of a hollow cylinder and which is seated on the inner section 202 between the two outer sections 210 and 212.

The outer sections 210 and 212 each have recesses 216 so that they can, on the one hand, be pushed over the bearing ends 204, 206 onto the inner section 202 and, on the other hand, a respective ring surface 218 is formed, by means of which the outer sections 210, 212 may be connected to the inner section 202 at the ends.

The cuttings edges 92 are arranged, for example, on the respective outer sections 210 and 212.

The inner section 202 and the outer sleeve 208 are braced against one another. For this purpose, form-locking connections designated as a whole as 220 are, for example, provided and these are oriented in a direction 222 parallel to the axis of rotation.

A form-locking connection 220 comprises a form-locking element 224 which is formed, for example, by a screw with a screw head 226. The screw head 226 makes a contact surface 228 available, by means of which a pressure force can be exerted on an end face 230 of the outer sleeve 208 in the direction of the inner section 202 parallel to the axis of rotation 84.

The form-locking element 224 is driven into the inner section 202 such that the form-locking element 224 exerts a tensile force on the inner section 202 in the direction of the outer sleeve 208 parallel to the axis of rotation 84. As a result, the inner section 202 is braced against the outer sleeve 208 in order to increase the rigidity of the cutting tool 80 and thus influence the mode structure of the cutting tool 80 with respect to a reduction in lateral cutting forces.

Figure 5:
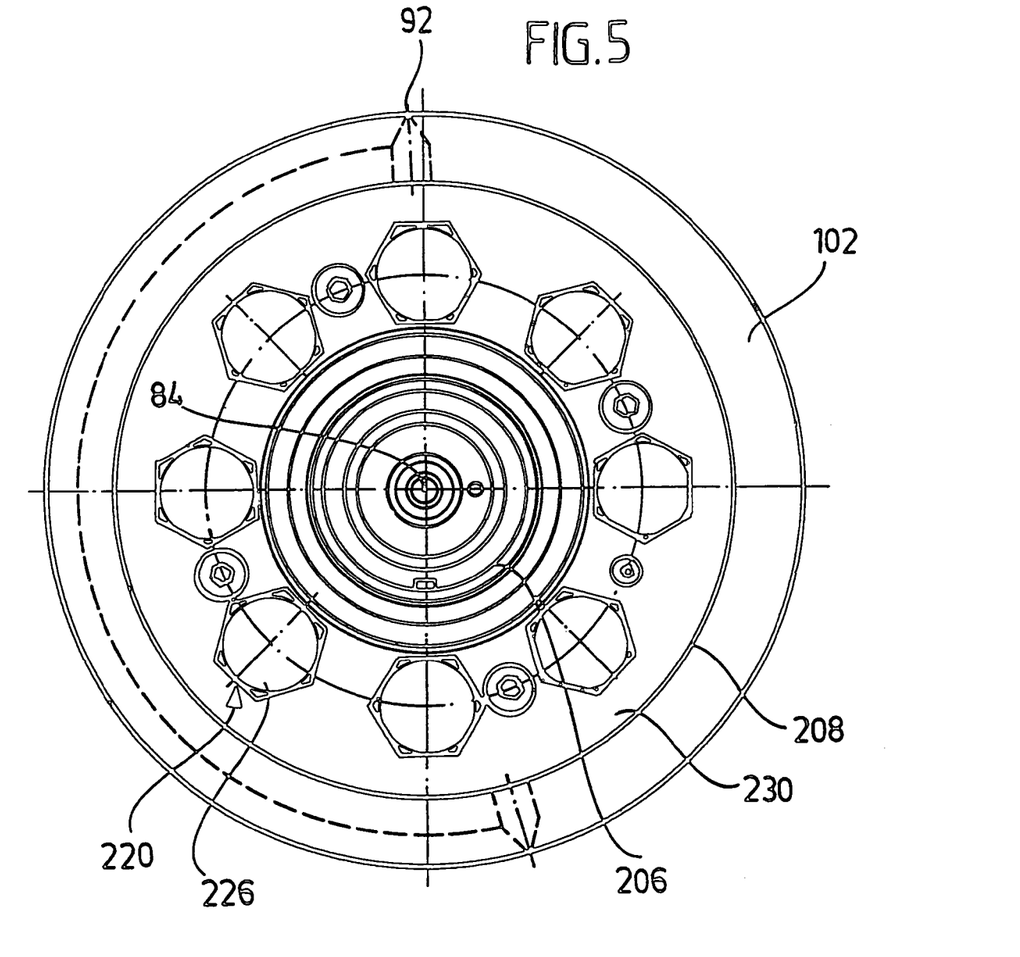
FIG. 5 shows a view of the cutting tool according to FIG. 4 in the direction B and FIG. 6 shows a schematic view of an additional embodiment of an inventive cutting device.

As shown in FIG. 5, a plurality of form-locking elements are arranged on the outer sleeve 208 at the ends so as to be distributed uniformly about the axis of rotation 84 such that the distribution of the form-locking connections 220 in relation to this axis of rotation 84 is point-symmetric; as a result, a uniform tensile force may be exerted on the inner section 202 via the end face 230.

The supporting rings 100, 102 (bearer rings) are, in a variation of one embodiment, arranged on a respective expansion member 240 which surrounds the respective tool shaft 82 in the form of an expansion member ring and is seated with a contact surface 242 associated with the tool shaft 82 on a circumferential surface 244 of the respective tool shaft 82 and is supported by this in a radial direction in relation to the axis of rotation 84.

Furthermore, the expansion member 240 abuts with an annular surface 247 facing the outer sleeve 208 on an inner end face 249 of the outer sleeve 208. An annular surface 246 of the expansion member 240 facing the inner section 202 has, on the other hand, clearance in relation to an end face 248 of the inner section 202 in order not to hinder the expansion thereof when subjected to the tensile stress.

The expansion member 240 is fixed against the end face 248 with clamping elements designed, for example, as screws and is, in addition, fixed with the annular surface 246 in a force-locking manner.

In a variation of one embodiment, the form-locking connections 220 serve at the same time for biasing the outer sleeve against the inner section 202 and for fixing the expansion member 240 on the inner section 202 and for expanding the supporting ring 102.

In an alternative embodiment (not shown in the drawings) the fixing of the expansion member 240 on the inner section 204 is independent of the form-locking connections 220 which have a tensile stress on the inner section 202 in order to bias the cutting tool 80. For this purpose, the form-locking connections 220 are arranged accordingly; for example, a succession of screw connections is provided in relation to an end face of the outer sleeve 208, with which screw connections alternately serve for biasing the cutting tool 80 and serve for the expandability of the supporting ring 102.

Irrespective of the manner, in which the expansion member 240 is fixed on the respective tool shaft 82, this preferably has, in relation to the axis of rotation 84, a radius which is smaller than a radius of the inner section 202 of the cutting tool 80. The expansion member 240 has an outer conical surface 250 extending in relation to the axis of rotation 84 at a slight cone angle, wherein the cone angle 250 of the outer conical surface has, for example, a cone ratio of 1:10.

The respective supporting ring is, for its part, provided on a side located opposite the supporting ring surface 106 with an inner conical surface 252 which has the same cone ratio as the outer conical surface 250.

The dimensioning of the inner conical surface 252 relative to the outer conical surface 250 is always brought about such that even with a minimum predetermined diameter of the supporting ring surface 106 the supporting ring 102 itself is expanded by the inner conical surface 252 and the outer conical surface 250 in a radial direction in relation to the axis of rotation 84 and, therefore, the inner conical surface 252 is always seated with tension on the outer conical surface 250 in order to avoid any radial yieldingness of the supporting ring 102 on account of the supporting thereof via the expansion member 240.

The additional design of the expansion member and its functioning are described in the German patent application No. 100 40 024.8 dated Aug. 16, 2000 of the predecessor company of the applicant which is not a prior publication and to which reference is expressly made.

By tightening the form-locking elements 224, a pressure force is exerted, on the one hand, at the end on the outer sleeve 208 in the direction of the inner section 202 and a tensile force on the inner section 202 at the end in the direction of the outer sleeve 208 parallel to the axis of rotation 84. As a result, inner section 202 and outer sleeve 210 are braced against one another, i.e. the cutting tool 80 is biased. As a result, the rigidity of the cutting tool 80 is again increased and the oscillation mode structure is altered in comparison with the non-biased state.

The intrinsic frequencies are increased and the oscillation amplitudes decreased with an unaltered oscillation excitation, similar to the influence of a tensile stress on a string, or rather a higher force must be used in order to maintain the same oscillation amplitude following the biasing. On account of the mounting of the cutting tool 80 on the machine frame 10, the force on the cutting tool 80 which excites oscillations is essentially independent of the biasing between inner section 202 and outer sleeve 208 parallel to the axis of rotation 84. This means that due to the alteration of the mode structure of the cutting tool 80 due to the biasing the oscillation amplitudes of the cutting tool 80 are also reduced, in particular, during a cutting procedure. For example, the amplitude in the center of the cutting tool was reduced to below 2 µm with a tensile force corresponding to 100 t for a cutting tool with a span of 700 mm and a diameter of 300 mm.

During a cutting procedure, it is fundamentally possible on account of the cutting forces for a pressure force to be transferred to the inner section 202 by means of the outer sleeve 208. The tensile forces which brace the inner section 202 against the outer sleeve 208 are selected such that they overcompensate for such pressure forces so that it is still ensured during a cutting procedure that oscillations of the cutting tool 80 caused by lateral cutting forces are minimized.

Figure 6:
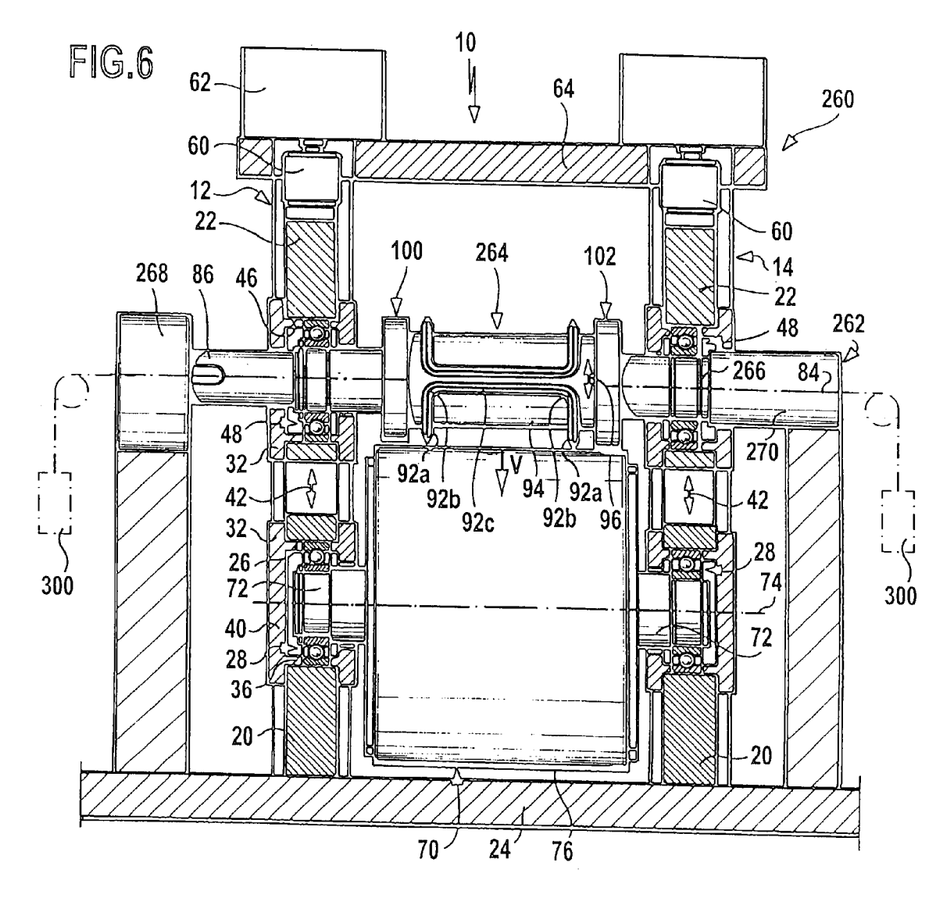

In a further embodiment of an inventive cutting device which is designated in FIG. 6 as a whole as 260, a biasing device designated as a whole as 262 is provided which acts on bearing ends of the cutting tool and via which a cutting tool 264 may likewise be biased.

In FIG. 6, the same structural elements according to FIG. 2 or elements having the same effect are given the same reference numerals.

The cutting tool 264 has a tool shaft 266 which is mounted on the machine frame 10 for rotation in the bearings 48.

A tensile stress may be exerted on oppositely located bearing ends of the cutting tool by means of the biasing device 262 in order to bias the cutting tool 264 in this way, i.e. to increase its rigidity and, therefore, to again influence its mode structure in the sense of decreasing any springing away in the case of lateral cutting forces, as already described above on the basis of the first embodiment of an inventive cutting device.

The biasing of the cutting tool 264 via the cutting device 260 can be brought about, for example, due to the fact that the tool shaft 266 is fixed in relation to the base plate 24 so as to be rotatable but non-displaceable, wherein oppositely located fixing devices 268 and 270, which are associated with the respective ends of the tool shaft 266, can, however, be moved away from one another relative to the base plate 24 in a fixable manner, for example, with the aid of a precision adjusting device in order to be able to introduce a tensile stress to the cutting tool 264 in this way via the bearing ends of the tool shaft.

In an alternative embodiment, it may also be provided for the ends 268, 270 to be loaded each time by weights 300 in order to cause the required biasing of the cutting tool 264 for the modification of its mode structure.

It may also be provided for the cutting tool 264 to be arranged in relation to the rotary bearings 48 so as to be rotatable but non-displaceable, wherein oppositely located rotary bearings (in relation to the ends 268, 270 of the tool shaft 266) can be moved apart relative to one another in order to introduce a tensile force to the tool shaft 266 and increase its rigidity.

In accordance with the invention, it may also be provided for an embossing device having an embossing tool with an embossing structure to be designed such that the embossing tool is biased. The embodiments of cutting devices and cutting tools described in the aforesaid also function for embossing devices and embossing tools.

Embossing tools which are rotatable about an axis of rotation may also be used during ultrasound cutting and/or ultrasound welding, during which a workpiece is acted upon with ultrasound by means of a sonotrode, wherein the workpiece is transported on the rotating embossing tool past the sonotrode and corresponding workpiece impressions may be produced by the embossing structure on the embossing tool in this way.

The invention claimed is:

1. A device for processing webs of material, comprising:
a machine frame,
an anvil roller mounted for rotation on the machine frame, and
one of a cutting tool and an embossing tool mounted for rotation on the machine frame about an axis of rotation, wherein:
the tool has one of a cutting and embossing structure disposed on an outer sleeve thereof, said structure cooperating with anvil surfaces of the anvil roller,
the outer sleeve includes a first end face on which a first pressure force is applied to provide tension along an inner section of the tool in a first direction and an oppositely disposed second end face on which a second pressure force is applied to provide tension along an inner section of the tool in a second direction,
a first bearing end extends from said inner section beyond the first end face of the outer sleeve,
a second bearing end extends from said inner section beyond the second end face of the outer sleeve,
the outer sleeve is positioned between the first bearing end and the second bearing end,
the tool rotates via bearings carried on said first and second bearing ends and arranged beyond the outer sleeve, and
said first and second pressure forces are applied essentially parallel to said axis of rotation to reduce a maximum oscillation amplitude of the tool transverse to said axis of rotation during one of a cutting and embossing procedure.

2. The device for processing webs of material as defined in claim 1, wherein the tool is a cutting tool and said inner section comprises an inner core, wherein the outer sleeve and inner core are braced against one another by the tension provided by said pressure forces.

3. The device for processing webs of material as defined in claim 2, wherein said core and outer sleeve are braced such that the core is subject to a tensile load in the direction of the outer sleeve.

4. The device for processing webs of material as defined in claim 2, wherein said core and outer sleeve are braced such that pressure forces on the cutting tool are adapted to be overcompensated by means of tensile stress on the core.

5. The device for processing webs of material as defined in claim 2, wherein said outer sleeve and core are braced by means of form-locking connections.

6. The device for processing webs of material as defined in claim 5, wherein a connection direction of a form-locking connection is oriented parallel to the axis of rotation of the cutting tool.

7. The device for processing webs of material as defined in claim 5, wherein a plurality of form-locking connections are arranged around the axis of rotation uniformly in relation to it.

8. The device for processing webs of material as defined in claim 5, wherein a form-locking element has a contact surface, a pressure being exertable on the outer sleeve by means of said contact surface.

9. The device for processing webs of material as defined in claim 8, wherein a screw element is seated on a contact element provided with the contact surface, a tensile force being exertable on the core by means of said screw element.

10. The device for processing webs of material as defined in claim 5, wherein the dimensions of a form-locking element and/or the number of form-locking elements are adapted to the diameter and the span of the cutting tool.

11. The device for processing webs of material as defined in claim 1, wherein the tool is a cutting tool provided with supporting rings, the cutting tool being supportable in relation to the anvil roller and/or vice versa by means of said supporting rings.

12. The device for processing webs of material as defined in claim 11, wherein the diameter of a supporting ring surface is adjustable for each supporting ring due to radial expansion of the supporting ring in the range below an elastic expansion limit of its material by means of an expansion device.

13. The device for processing webs of material as defined in claim 11, wherein the diameter of a supporting ring is adjustable by means of a form-locking element, a tensile stress being exertable on the inner section of the cutting tool in relation to the outer sleeve with said form-locking element.

14. The device for processing webs of material as defined in claim 12 wherein the cutting tool is adapted to receive said pressure force to provide said tension independently of the expansion of the supporting rings.

15. The device for processing webs of material as defined in claim 1, wherein the tool is a cutting tool and a device for providing said pressure forces to the cutting tool is arranged on the machine frame, a tensile stress being exertable between oppositely located ends or end areas of the cutting tool by means of said device.

16. The device for processing webs of material as defined in claim 1, wherein said tool is a cutting tool rotatable about said axis of rotation and has a cutting edge adapted to be brought into cooperation with said anvil surfaces of said anvil roller, wherein:
the cutting tool is biased by said pressure forces applied to the end faces of the cutting tool to provide tension along the cutting tool essentially parallel to said axis of rotation, said tension reducing a maximum oscillation amplitude of the cutting tool transverse to said axis of rotation during a cutting procedure.

17. The device for processing webs of material as defined in claim 16, wherein the cutting edge is seated on said outer sleeve, and said inner section comprises an inner core, wherein outer sleeve and inner core are braced against one another by said tension.

18. The device for processing webs of material as defined in claim 17, wherein the inner core and outer sleeve are biased such that the inner core is subject to a tensile load in the direction of the outer sleeve.

19. The device for processing webs of material as defined in claim 17, wherein the inner core and outer sleeve are biased such that pressure forces on the cutting tool are adapted to be overcompensated by means of tensile stress on the inner core.

20. The device for processing webs of material as defined in claim 17, wherein the outer sleeve and inner core are biased by means of form-locking connections.

21. The device for processing webs of material as defined in claim 20, wherein a connection direction of a form-locking connection is oriented parallel to the axis of rotation of the cutting tool.

22. The device for processing webs of material as defined in claim 20, wherein a plurality of form-locking connections are arranged uniformly around the axis of rotation.

23. The device for processing webs of material as defined in claim 20, wherein a form-locking element has a contact surface, a pressure force being exertable on the outer sleeve by means of said surface.

24. The device for processing webs of material as defined in claim 23, wherein a screw element is seated on a contact element provided with the contact surface, a tensile force being exertable on the inner core by means of said screw element.

25. The device for processing webs of material as defined in claim 20, wherein the dimensions of a form-locking element and/or the number of form-locking elements are adapted to the diameter and the span of the cutting tool.

26. The device for processing webs of material as defined in claim 16, wherein the cutting tool is provided with supporting rings, the cutting tool being supportable in relation to the anvil roller and/or vice versa by means of said rings.

27. The device for processing webs of material as defined in claim 26, wherein the diameter of a supporting ring surface is adjustable for each supporting ring due to radial expansion of the supporting ring in the range below an elastic expansion limit of its material by means of an expansion device.

28. The device for processing webs of material as defined in claim 26, wherein the diameter of a supporting ring is adjustable by means of a form-locking element, a tensile stress being exertable on an inner section of the cutting tool in relation to an outer sleeve by means of said form-locking element.

29. The device for processing webs of material as defined in claim 27, wherein the cutting tool is adapted to be biased independently of the expansion of the supporting rings.

30. The device for processing webs of material as defined in claim 1 wherein:
said tool is an embossing tool mounted for rotation on the machine frame about an axis of rotation,
said embossing structure is disposed on said outer sleeve,
said embossing structure cooperates with anvil surfaces of the anvil roller, and
said pressure forces are applied essentially parallel to said axis of rotation to reduce a
maximum oscillation amplitude of the embossing tool transverse to said axis of rotation during an embossing procedure.

31. The device for processing webs of material as defined in claim 1 wherein:
said tool is an embossing tool rotatable about said axis of rotation.

* * * * *